Aug. 2, 1927.
J. E. LIEBRICH
1,637,528
AUTOMOBILE SIGNAL ACCESSORY
Filed July 17, 1924  3 Sheets-Sheet 1
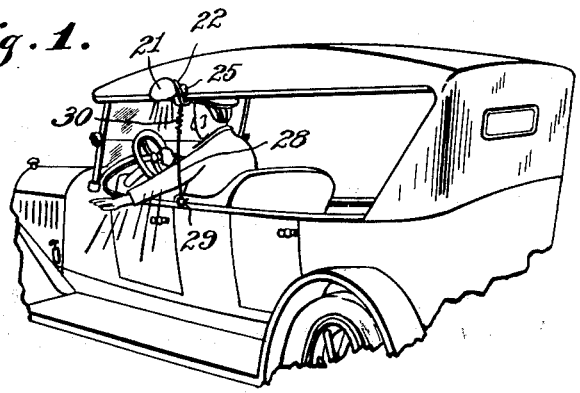
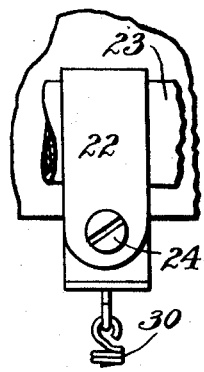
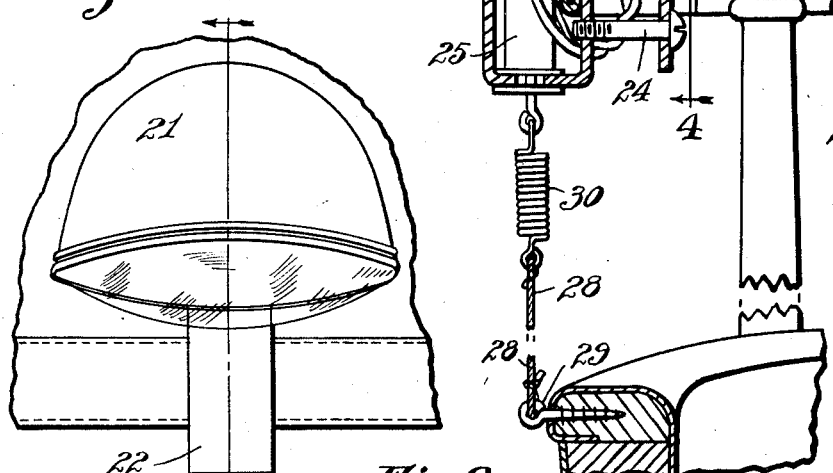
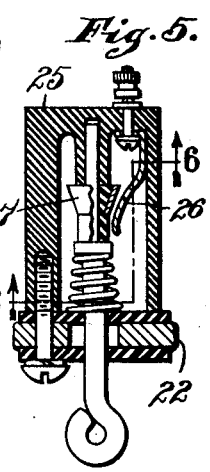
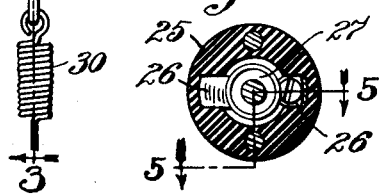
INVENTOR.
John E. Liebrich,
BY
Hood + Hahn.
ATTORNEYS Aug. 2, 1927.

J. E. LIEBRICH 1,637,528

AUTOMOBILE SIGNAL ACCESSORY

Filed July 17, 1924    3 Sheets-Sheet 2

INVENTOR.
John E. Liebrich,
BY
Hood + Hahn.
ATTORNEYS

Aug. 2, 1927.
J. E. LIEBRICH
1,637,528
AUTOMOBILE SIGNAL ACCESSORY
Filed July 17, 1924   3 Sheets-Sheet 3
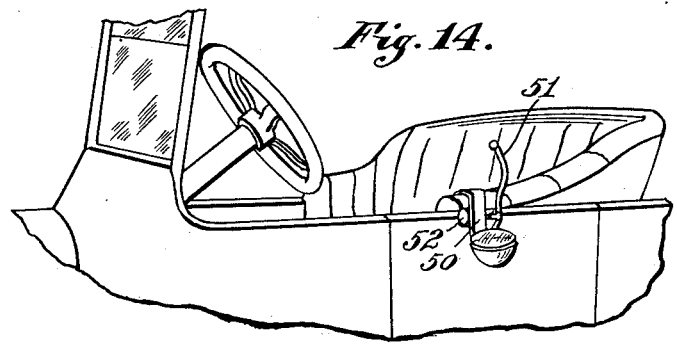
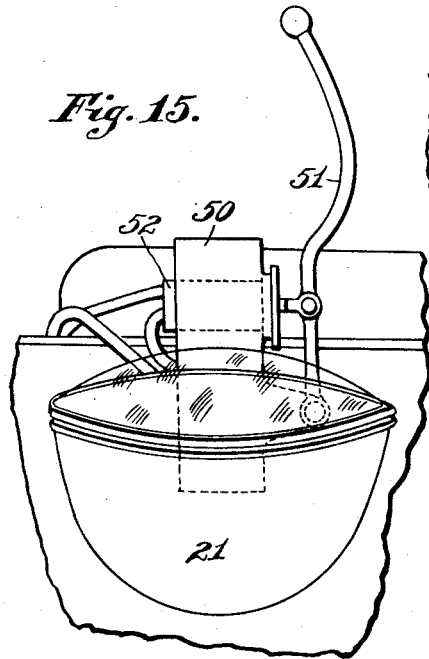
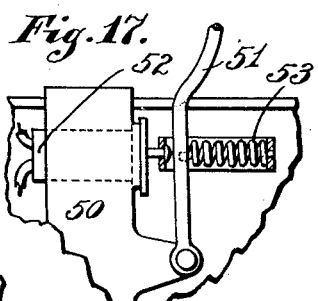
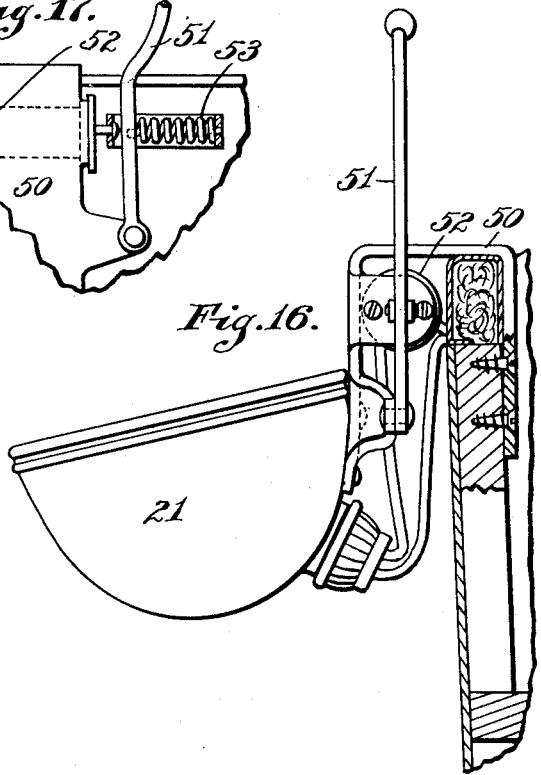
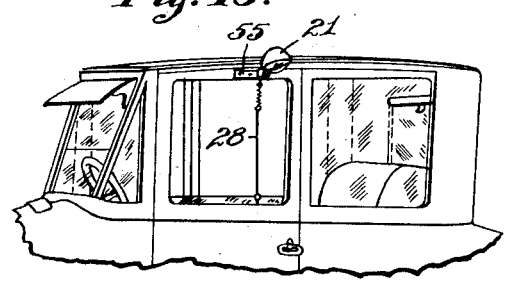
INVENTOR.
John E. Liebrich,
BY
Hood & Hahn.
ATTORNEYS Patented Aug. 2, 1927.

1,637,528

UNITED STATES PATENT OFFICE.

JOHN E. LIEBRICH, OF INDIANAPOLIS, INDIANA.

AUTOMOBILE SIGNAL ACCESSORY.

Application filed July 17, 1924. Serial No. 726,438.

The object of my invention is to produce an attachment for automobiles of such character that the extension of an arm of the driver, in normal signaling operations, may operate to cause the projection of a beam of light to illuminate said arm.

Figure 7:
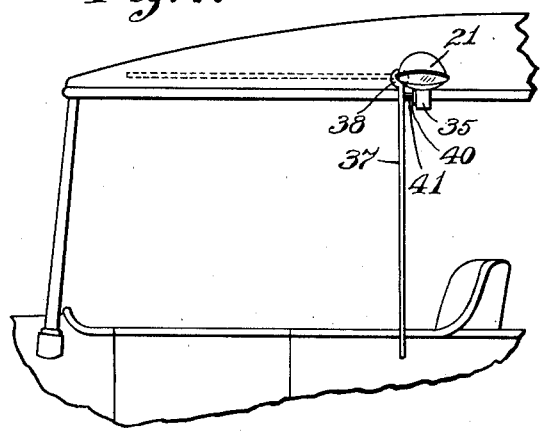
Figure 8:
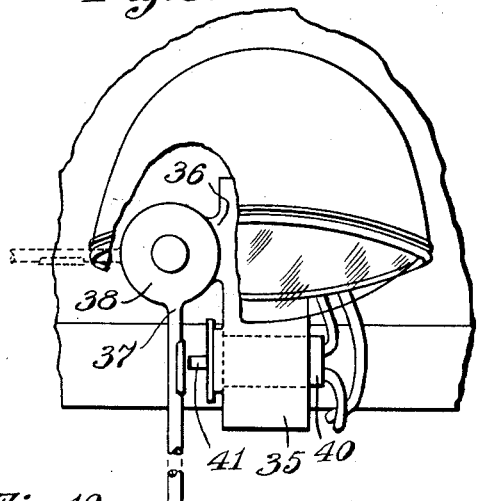
Figure 9:
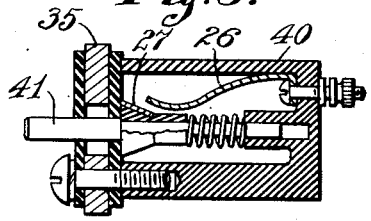
Figure 10:
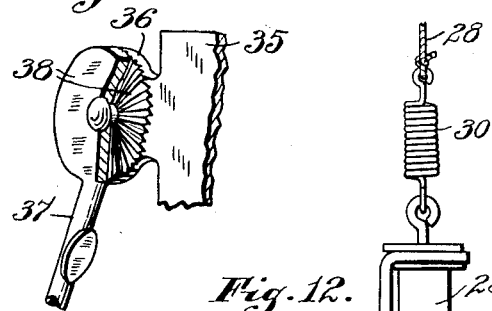
Figure 11:
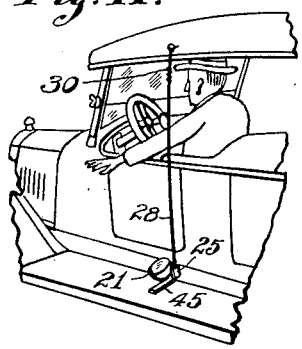
Figure 12:
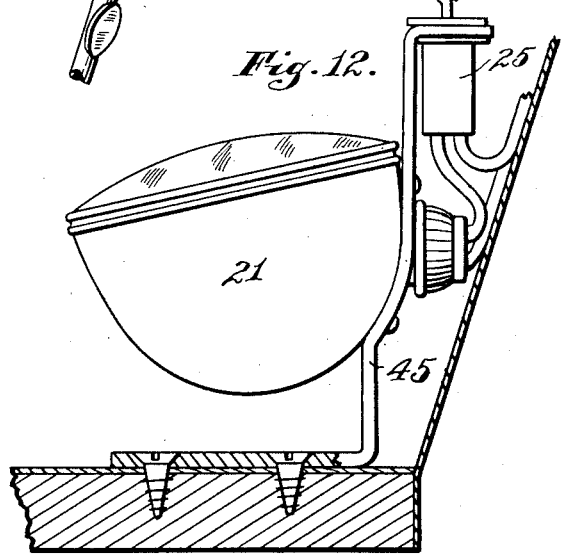
Figure 13:
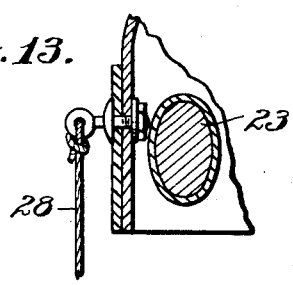

The accompanying drawings illustrate my invention. Fig. 1 is a perspective view of an automobile equipped with one form of my invention; Fig. 2 a side elevation on a larger scale of the lamp and adjacent parts; Fig. 3 a section on line 3—3 of Fig. 2; Fig. 4 a detail on line 4—4 of Fig. 3; Fig. 5 a section, on line 5—5 of Fig. 6, of a desirable form of electric switch for use as a part of my invention; Fig. 6 a section on line 6—6 of Fig. 5; Fig. 7 a side elevation of a modification; Fig. 8 a fragmentary detail on a somewhat larger scale, of the switch mechanism indicated in Fig. 7; Fig. 9 an axial section of the switch shown in Fig. 8; Fig. 10 a fragmentary detail of the pivotal support for the operating arm shown in Fig. 7; Fig. 11 a perspective view of another modification; Fig. 12 an elevation on a larger scale of the lamp unit shown in Fig. 11; Fig. 13 a fragmentary section showing the manner of connecting the operating cord in Fig. 17 with the canopy; Fig. 14 a perspective view of another modification; Fig. 15 a side elevation of the structure shown in Fig. 14; Fig. 16 an elevation in a plane at right angles to the plane of Fig. 15; Fig. 17 a fragmentary detail of parts shown in Figs. 14 to 16 and Fig. 18 a perspective of my invention as applied to a closed body.

Fundamentally, the invention consists of a small electric lamp capable of delivering a small, reasonably powerful light beam, means by which the lamp may be properly supported on the automobile body, and an operating member which may, at proper times, be so positioned relative to the driver that, in the movement of the driver's signaling arm to and through signaling positions, the lamp will be lighted and the signaling arm thus illuminated.

In Figs. 1 to 6, inclusive, the lamp 20 is arranged in a suitable reflector 21 and is supported by a hook-shaped fitting 22 which may be hooked over and clamped upon the canopy bow 23 by clamping screw 24. Fitting 22 carries an electric switch 25 arranged in the lamp circuit and comprising contact elements 26 and 27 normally out of contact and one formed for reception of one end of an operating cord 28, the other end of which may be attached at 29 to the car body. The cord 28, as clearly shown in Fig. 1, is arranged so as to be struck by the arm of the operator as the arm is extended to a signaling position and this will bring contact 27 into engagement with contact 26 and thus causing a lighting of the lamp and corresponding illumination of the signaling arm. As the movement of the arm should not be unduly retracted, and as the movement of contact 27 needs to be very slight, I think it advisable to include, in the connection 28, a light coil spring 30. In other words, the cord 28 may be elastic.

Of course it will be readily understood that the switch may be operated by other means. For instance, in Fig. 7 the lamp-supporting bracket 35 is provided with an extension 36 upon which is pivoted an operating arm 37 which may conveniently be a comparatively light spring rod, say a steel or brass rod an eighth or quarter inch in diameter, the pivotal connection 38 being of such character that the rod may be extended down in the path of movement of the signaling arm of the operator as indicated in full lines in Fig. 7, or swung upwardly out of the way in the day time as indicated in dotted lines in Fig. 7, the connection 38 being of any well-known form which will retain the rod in either of its positions. Bracket 35 will carry switch 40, the movable terminal of which is provided with a pin 41 arranged in the path of movement of arm 37 when in its depending position.

It will also be readily understood that the lamp may be placed at any desired point as, for instance, it may be supported by a bracket 45 in the corner between the footboard and chassis, as shown in Figs. 11 and 12 and the operating element 28 carried upwardly and secured to the canopy bow as shown in Figs. 11 and 13.

Again, the lamp may be supported by a bracket 50 which may be hooked over and secured to the body or front seat frame, said bracket forming a pivotal support for short, upwardly extending operating arm 51 arranged in the path of movement of the signaling arm of the operator and acting upon the movable terminal of a switch 52, being normally yieldingly held in circuit-opening position by spring 53.

In applying my accessory to a closed body, the lamp-supporting bracket 55 may be secured to the upper bar of the front door and the operating cord 28 extended downwardly across the window opening and secured at its lower end to the lower bar of the window frame.

I claim as my invention:

1. An automobile accessory comprising a lamp support by which it may be attached to an automobile, an electric switch, and an operating element connected to said switch and adapted to be extended into the normal horizontal path of movement of the signaling arm of the driver.

2. An automobile accessory comprising a lamp support by which it may be attached to an automobile, an electric switch, and an operating element connected to said switch and adapted to be extended into the normal horizontal path of movement of the signaling arm of the driver, said operating element comprising a flexible cord.

In witness whereof, I JOHN E. LIEBRICH, have hereunto set my hand at Indianapolis, Indiana, this 15th day of July, A. D. one thousand nine hundred and twenty-four.

JOHN E. LIEBRICH.